TAPE GUIDE APPARATUS FOR MAGNETIC TAPE TRANSPORTS

Filed Nov. 20, 1961 3 Sheets-Sheet 1

INVENTOR.
KENJI J. SAMESHIMA
BY
Christie, Parker & Hale
ATTORNEYS.

Nov. 5, 1963 K. J. SAMESHIMA 3,109,573
TAPE GUIDE APPARATUS FOR MAGNETIC TAPE TRANSPORTS
Filed Nov. 20, 1961 3 Sheets-Sheet 2

INVENTOR.
KENJI J. SAMESHIMA
BY
Christie, Parker & Hale
ATTORNEYS.

TAPE GUIDE APPARATUS FOR MAGNETIC TAPE TRANSPORTS

Filed Nov. 20, 1961 3 Sheets-Sheet 3

INVENTOR.
KENJI J. SAMESHIMA
BY
Christie, Parker & Hale
ATTORNEYS.

United States Patent Office 3,109,573
Patented Nov. 5, 1963

3,109,573
TAPE GUIDE APPARATUS FOR MAGNETIC TAPE TRANSPORTS

Kenji J. Sameshima, West Covina, Calif., assignor to Burroughs Corporation, Detroit, Mich., a corporation of Michigan Filed Nov. 20, 1961, Ser. No. 153,337
11 Claims. (Cl. 226—199)

This invention relates to apparatus for guiding a thin flexible strip of material as the strip is longitudinally moved over a support member, and, more particularly, to a novel guide apparatus for laterally supporting a magnetic tape as it is moved under a magnetic head in a magnetic tape transport.

Generally, digital information stored on a magnetic tape is recorded in parallel tracks along the length of the tape. To read the digital information, the magnetic tape is longitudinally directed under a magnetic read head in a magnetic tape transport. The information is detected by the read head and applied to circuitry associated with the tape transport. If lateral movement or "skewing" of the tape is allowed as it moves under the read head, bits of digital information may be missed by the read head resulting in operational errors in the circuitry associated with the tape transport. Thus, it is necessary, when passing a magnetic tape under a magnetic head, to provide means for prohibiting lateral movement of the tape relative to the head.

In the past, two basic arrangements have been utilized to provide lateral guiding for a moving magnetic tape. The first means employs a tape support arrangement having two fixed shoulders disposed on either side of the tape. The fixed shoulders are dimensioned to accommodate a tape of maximum width plus a small safety factor. This arrangement provides satisfactory guiding operation for the maximum width tape. However, when a tape of a lesser width is being read such a fixed guide arrangement does not provide close tolerance support for the edges of the tape and the tape may run through the guides at an angle relative to the read head thereby allowing bits of information to be lost.

The second type of guide arrangement employs one or more spring-loaded shoulders mounted for lateral sliding motion relative to a reference panel of the tape transport. The shoulders press against an edge of the tape to maintain alignment of the tape against a fixed shoulder as the tape passes under a magnetic read head. The pressure on the edge of the tape causes the tape to wear, thereby developing oxide powders and lint from the tape. The lint and powder tend to become seated around the shoulder resulting in an increase in friction to the sliding movement of the shoulder in response to the spring force applied thereto. Thus, after a period of time, the force applied to the edge of the tape varies resulting in a skewing of the tape at high speeds. To correct for this it is necessary to stop the operation of the tape transport and clean out the excess oxide powder and lint which has seated itself around the spring-loaded shoulder. In practice, such maintenance operation may be required as often as every three or four hours of operation.

In view of the above, the present invention provides an improved mechanical tape guiding arrangement which laterally supports a magnetic tape as it is longitudinally directed under a magnetic head without exerting excessive forces on the tape and without requiring frequent maintenance.

Briefly, to provide such lateral support of a magnetic tape as it is longitudinally directed past a main panel of a magnetic tape transport, the present invention includes a support member coupled to the panel. The support member has a fixed shoulder, a tape supporting portion adjacent to the shoulder, and a portion coupled to the panel which is recessed from the supporting portion. The supporting portion of the support member has a width which is less than the width of the magnetic tape such that an edge of the tape overlaps the supporting portion. The tape is maintained against the fixed shoulder by an arm which is pivoted from a point above the support member and which extends into the recessed portion to contact the overlapping edge of the tape. The arm is constructed to produce a moment of force about the pivot point and develop a lateral force on the overlapping edge of the tape just sufficient to maintain the tape against the shoulder as it is longitudinally directed over the support member.

Due to the force applied by the arm, lateral movement of the tape is prohibited with a minimum of oxide powder being developed. Since the arm is pivoted from a point above the support member and since any oxide powder and lint developed by the wearing of the overlapping tape edge passes in a downward direction, the oxide powder does not interfere with the operation of the guide apparatus. Thus a substantially uniform force is maintained on the tape regardless of the period of operation of the tape transport.

For a more complete understanding of the above, as well as the particular design features of the present invention, reference may be made to the following detailed description which is to be considered with the drawings, in which.

Figure 1:
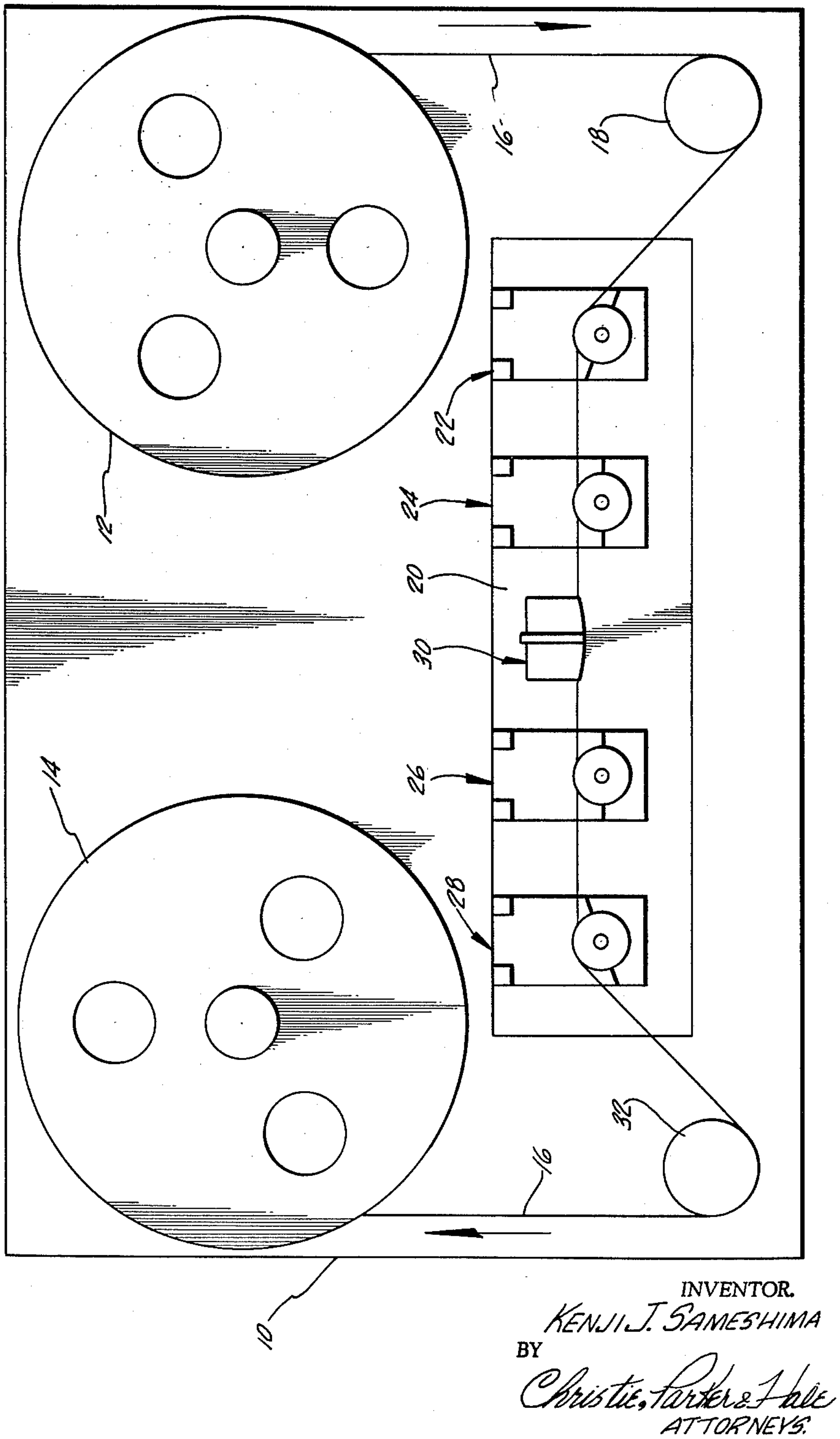
FIGURE 1 is a diagrammatic representation of the tape storage area of a tape transport utilizing the guiding arrangement of the present invention.

Referring to FIGURE 1, there is shown a tape storage compartment of a tape transport utilizing the tape guide apparatus of the present invention. The tape storage area includes a main panel 10 to which there is mounted a feed reel 12 and a take-up reel 14. A magnetic tape 16 passes from the feed reel 12 around a fixed tape guide 18 to the tape guiding arrangement of the present invention. Briefly, the tape guiding arrangement includes a mounting panel 20 which is coupled to the main panel 10. The mounting panel 20 supports a plurality of tape support arrangements 22, 24, 26 and 28, respectively, as well as a magnetic read-write head 30. The magnetic tape passes over the support arrangements 22 and 24 under the magnetic head 30 over the tape support arrangements 26 and 28 around a fixed tape guide 32 to the take-up reel 14.

By a motor drive (not specifically shown) the feed reel 12 and the take-up reel 14 are caused to rotate at a high speed. The magnetic tape 16 is thereby fed from the feed reel 12, guided by the tape guide arrangement of the present invention under the magnetic head 30 to the take-up reel 14.

Figures 2, 3:
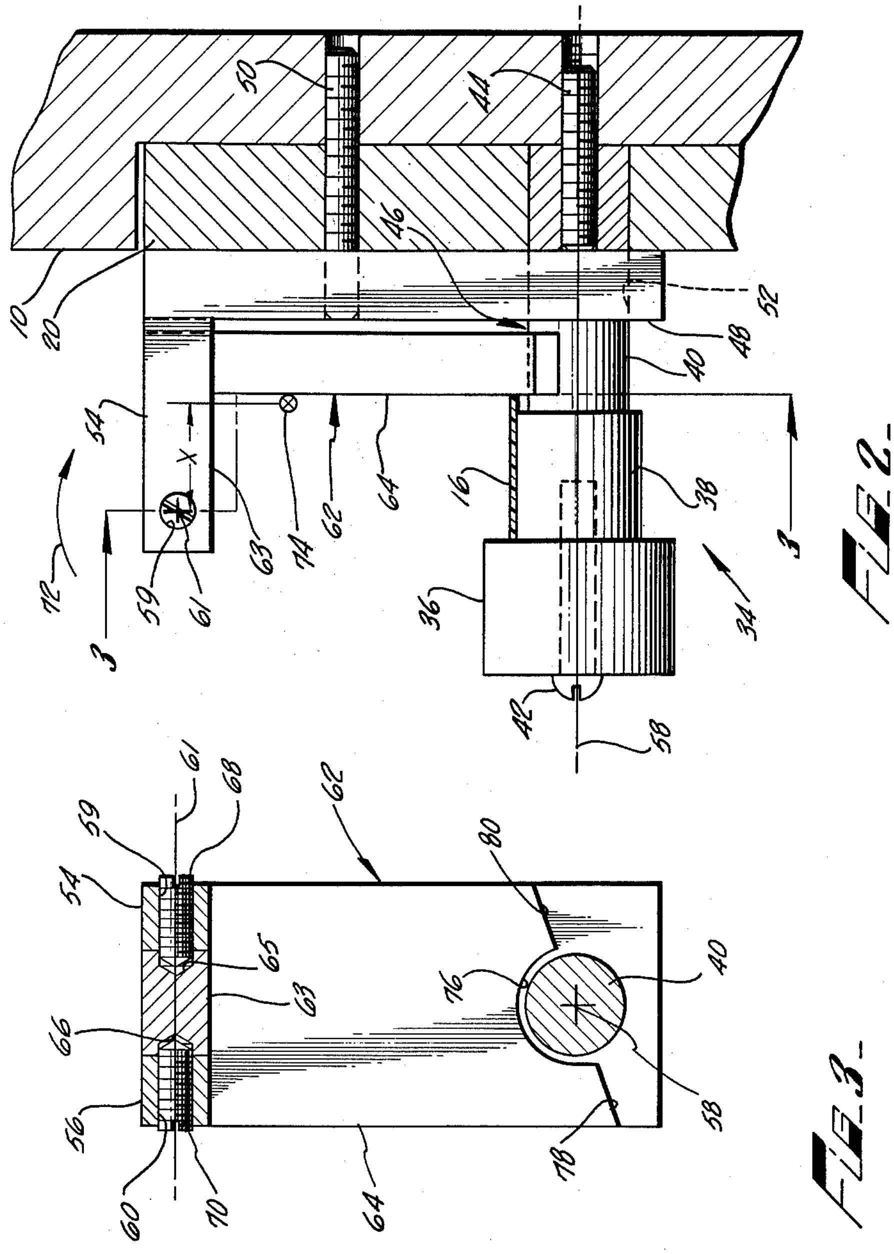
FIGURE 2 is a sectional side view of one form of the tape guiding arrangement of the present invention.
FIGURE 3 is a partial sectional front view of the tape guide arrangement taken along the line 3—3 represented in FIGURE 2.

To prohibit lateral movement of the magnetic tape 16 as it is longitudinally passed under the magnetic head 30 each of the tape guide arrangements 22, 24, 26 and 28 may take the form of the tape guide arrangement represented in FIGURES 2 and 3.

As represented, the tape guide apparatus of the present invention includes a support member represented generally as 34. The support member 34 includes a shoulder member 36, a tape supporting portion 38, and a recessed portion 40.

The shoulder member 36 is attached to the tape supporting portion 38 by a screw represented at 42. In this manner the shoulder member 36 defines a flanged edge for the support member 34 against which an edge of the tape 16 is guided to maintain the lateral position of the tape 16 as it moves under the read head 30 represented in FIGURE 1.

The portion 40 of the support member 34 is recessed relative to the supporting portion 38 and passes through the mounting panel 20. The recessed portion 40 is coupled to the main panel 10 by a screw represented at 44. Thus the portion 40, together with the supporting portion 38 and the mounting panel 20, defines a recess 46 between the portion 38 and the panel 20.

As illustrated, the tape supporting portion 38 of the supporting member 34 has a width which is less than the width of the tape 16. Accordingly, when the tape 16 is contacting the shoulder 36 an edge thereof overlaps the tape supporting portion 38 and extends into the recess 46.

Extending along the face of the mounting panel 20 is a plate member 48 coupled to the mounting panel and the main panel 10 by screws indicated at 50. The plate 48 includes a hole 52 which communicates with the recessed portion 40 of the support member 34 as it passes through the mounting panel 20.

Extending from the plate 48 are a pair of laterally spaced support arms 54 and 56 positioned above a longitudinal axis 58 of the support member 34. The arms 54 and 56 are evenly spaced on either side of the longitudinal axis 58 and include threaded holes 59 and 60, respectively. The holes 59 and 60 communicate with each other along a common axis 61 which is substantially parallel with the plate 48.

Positioned between the support arms 54 and 56 is an arm 62 of an L-shaped cross section having mutually perpendicular sections 63 and 64. The section 63 extends substantially parallel to the support arms 54 and 56 and includes a pair of recesses 65 and 66 which communicate with the holes 59 and 60, respectively. The arm 62 is pivoted about the axis 61 by a pair of threaded pin members 68 and 70 which are threaded through the holes 59 and 60 into the recesses 65 and 66. By so pivoting the arm 62 the section 64 extends downwardly along the plate 48 into the recess 46 to contact an edge of the tape 16.

Since the L-shaped arm 62 extends from the support arms 54 and 56 toward the plate 48 and then downwardly along the plate 48, substantially the entire mass of the arm 62 is located on a side of the pivot point adjacent the plate 48. Thus, the arm 62 sets up a moment of force about the pivot point in a clockwise direction as represented by the arrow 72. The amount of force is equal to the mass of the L-shaped arm 62 and the perpendicular distance X between the center of gravity of the L-shaped arm, indicated at 74, and the pivot point along the axis 61.

Due to the moment of force, the section 64 of the arm 62 exerts a lateral force on the edge of the tape 16 toward the shoulder 36. By proportioning the mass of the arm 62 and the distance X between the center of gravity of the arm and the pivot point, the force exerted on the edge of the tape 16 may be adjusted to maintain the tape 16 against the shoulder 36 as the tape is longitudinally passed over the support portion 38 of the support member 34. In practice it has been found that a lateral force between 5.5 and 5.7 grams maintains the tape against the shoulder 36 with a minimum of tape wear.

In this manner lateral movement of the tape 16 as it passes under the magnetic head is prevented with a minimum of wear on the edge of the tape and a minimum amount of oxide powder being developed. Since any oxide powder and lint which is formed due to a wearing of the magnetic tape passes in a downward direction it does not seat itself around the pivot point and thus does not interfere with the lateral force which is developed by the arm 62. Accordingly, a substantially uniform force is continuously exerted on the edge of the tape 16 regardless of the period of time over which the tape transport is operating.

In practice, magnetic tapes are not of constant width. Although the variations in tape width are extremely small and are relatively gradual, when the tape 16 is driven at high speeds over the support member 34 it appears to the arm 62 that there are sudden variations in tape width. To prevent possible bouncing of the arm 62 against the edge of the tape 16 as the tape is moved at high speed, the mass of the arm 62 is made quite large relative to the tape 16. Thus, the arm possesses a high inertia. Variation in tape width, in setting up variation in the force applied by the tape against the arm, therefore does not cause a movement of the arm but rather merely forces the tape 16 more tightly against the shoulder 36. Thus, in effect, the mass of the arm 62 itself dampens out any possible vibration in the arm at high tape speeds.

To also prevent possible vibration of the arm 62 at tape high speed, the pins 68 and 70 are threaded snugly into the recesses 65 and 66, respectively. This prevents any play of the arm which might set up vibrations at the pivot points.

As illustrated, the end of the section 64 adjacent the support member 34 is slotted in the form of an arc, represented at 76, which is concentric with the recessed portion 40 of the support member 34. Thus, portions of the arm 62, represented at 78 and 80, extend downward on either side of the support member 34. The portions 78 and 80, as illustrated, may be tapered away from a horizontal plane. In this manner the section 64 of the arm 62 may contact the overlapping edge of the tape 16 below the surface of the support member 34 to laterally guide the tape 16 from the support member to a fixed guide such as 32 illustrated in FIGURE 1.

In a similar manner the tape support arrangement 22 illustrated in FIGURE 1 may include an arm having end portions which are tapered in an opposite direction to support the tape 16 as it passes from the fixed guide 18 upward to the tape support portion of its support member.

Figure 4:
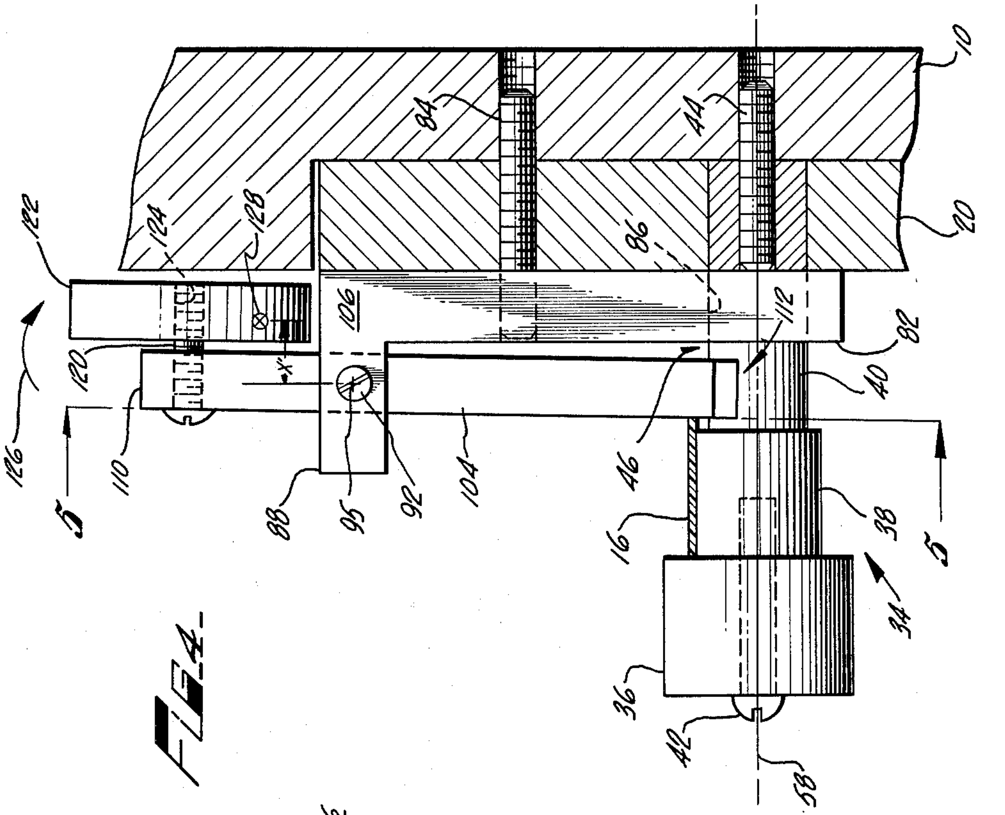
FIGURE 4 is a sectional side view of another form of the tape guide arrangement of the present invention.
Figure 5:
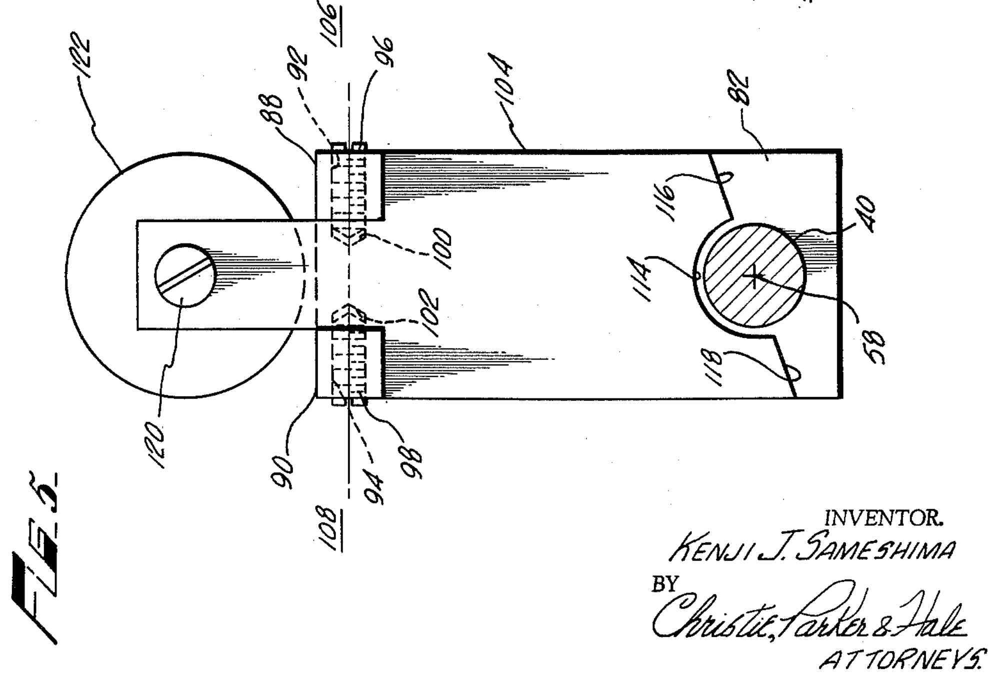
FIGURE 5 is a partial sectional front view of the tape guide arrangement taken along the line 5—5 in FIGURE 4.

An alternative form for the tape guide arrangement of the present invention is represented in FIGURES 4 and 5. The tape guide arrangement includes means for varying the lateral force set up on a magnetic tape. Thus, the embodiment represented in FIGURES 4 and 5 is ideally suited to use in tape transports which utilize tapes of different weight, width and thickness.

As illustrated, the support member arrangement of the embodiment shown in FIGURES 4 and 5 is identical to that discussed in connection with FIGURES 2 and 3. Thus, only the essential differences between the embodiments of FIGURES 2 and 3 and that of FIGURES 4 and 5 are herein discussed.

As described in connection with FIGURES 2 and 3, the magnetic tape 16 is maintained against the shoulder 36 by a lateral force transmitted through an arm pivoted from a point above the support member 34. To provide the desired pivoting arrangement a plate 82 is coupled to the mounting panel 20 by a screw arrangement represented at 84. The plate 82 includes a hole 86 which communicates with the support member 34 as it passes through the mounting panel 20 to the main panel 10.

The plate 82, similar to the plate 48 described in connection with FIGURES 2 and 3, includes a pair of support arms 88 and 90. The arms 88 and 90 extend in a common horizontal plane above and are evenly spaced on either side of the longitudinal axis 58 of the support member 34. As represented, the arms 88 and 90, together with the plate 82, define a support arrangement having an L-shaped cross section. The arms 88 and 90 include threaded holes 92 and 94 which communicate with each other along a common axis 95.

Positioned within the holes 92 and 94 are threaded pin members 96 and 98, respectively. The pin members 96 and 98 communicate with recesses 100 and 102 in an arm member 104 to define a pair of pivot points 106 and 108 about which the arm 104 is pivoted.

As illustrated, the arm 104 is substantially straight and is pivoted at the points 106 and 108 between an end 110 and an end 112 of the arm 104. The end 112 of the arm 104 extends downward from the pivot points along the plate 82 into the recess 46. The end 112, similar to the arm 62 described in connection with FIGURES 2 and 3, includes slot 114 extending around the portion 40 of the support member 34 and end portions 116 and 118 which may be tapered to provide means for continuously contacting the tape 16 as it passes over the support portion 38 to one of the fixed guides 18 and 32.

The end 110 of the arm 104 extends above the pivot points 108 and 106. Extending through the arm 104 in a direction substantially normal thereto is a screw member 120. A weight, represented at 122, having a threaded hole 124 is mounted on the screw 120. By turning the weight 122 the distance between the weight and the arm 104 may be varied.

Due to the mass of the weight 122, as well as that of the screw 120 and the arm 104, a moment of force is developed about the pivot points 106 and 102 in a clockwise direction as represented by the arrow 126. The moment of force acting about the pivot points 106 and 108 is equal to a product of the masses of the arm 104, the screw 120 and the weight 122, and the perpendicular distance X′ between the pivot points and the center of gravity, represented at 128, of the arm arrangement including the arm 104, the screw 120 and the weight 122. By varying the displacement of the weight 122 from the arm 104, the distance between the center of gravity and the pivot point may be increased or decreased thereby varying the moment of force about the pivot points. In this manner the lateral force exerted by the arm 104 on the tape 16 may be adjusted such that the tape 16 is gently maintained against the shoulder 36 as the tape longitudinally passes over the support portion 38 and under the magnetic head 30.

By so controlling the force exerted on the tape edge a minimum of tape wear results. Further, since the tape guide arrangement illustrated in FIGURES 4 and 5 includes a pivot point located in a plane above the tape, oxide powders developed with tape wear in passing in a downward direction do not effect the operation of the guide arrangement. Thus, a uniform force is maintained on the tape edge regardless of the period of operation of the tape transport unit.

What is claimed is:

1. Apparatus for guiding a thin, laterally flexible strip of material as it is longitudinally directed past a stationary reference panel, comprising: a support member coupled to the reference panel, the support member including a shoulder against which a first edge of the strip is laterally positioned, a first portion adjacent to the shoulder for contacting a surface of the strip to laterally support the strip, the first portion having a width which is less than the width of the strip, and a second portion recessed from the first portion and coupled to the panel to define a recess between the first portion and the panel; an arm; means for pivoting the arm about a pivot point above the support member such that the arm extends into the recess to contact and exert a lateral force on a second edge of the strip which gently maintains the first edge of the strip in contact with the shoulder as the strip moves longitudinally over the support member.

2. The apparatus defined in claim 1 wherein the arm is an L-shaped arm having one end of the L pivoted from the point above the support member and the other end of the L extending into the recess to exert the lateral force upon the second edge of the strip.

3. The apparatus defined in claim 2 wherein the L-shaped arm is dimensioned to develop a lateral force on the strip of between 5.5 to 5.7 grams.

4. Apparatus for guiding a thin, flexible strip of material as it is longitudinally directed past a reference panel, comprising: a first support member coupled to the reference panel, the first support member including a shoulder against which a first edge of the strip is laterally positioned, a first portion adjacent to the shoulder for contacting a surface of the strip to laterally support the strip, the first portion having a width which is less than the width of the strip, and a second portion recessed from the first portion and coupled to the panel to define a recess between the first portion and the panel; a second support member extending from the panel above the first support member; an arm; means for pivoting the arm about a point on the second support member such that the arm extends into the recess to contact and exert a lateral force on a second edge of the strip just sufficient to maintain the first edge of the strip gently in contact with the shoulder.

5. Apparatus for guiding the lateral movement of a thin, flexible strip as it moves in a longitudinal direction past a reference panel comprising: a support member coupled to the reference panel, the support member including a shoulder against which a first edge of the strip is laterally positioned and a support portion adjacent to the shoulder for contacting a surface of the strip to laterally support the strip; an arm; means coupled to the panel for pivoting the arm from a pivot point above the support member such that the arm contacts and exerts a lateral force on a second edge of the strip toward the shoulder to maintain the first edge of the strip gently in contact with the shoulder as the strip is moved longitudinally over the support member.

6. Apparatus for guiding a thin, flexible strip of material as it moves longitudinally past a reference panel, comprising: a first support member coupled to the reference panel, the first support member including a shoulder against which a first edge of the strip is laterally positioned and a support portion adjacent to the shoulder for contacting a surface of the strip to support the strip; a second support member extending from the panel above the first support member; an arm; means for pivoting the arm about a point on the second support member such that the arm contacts and exerts a lateral force on a second edge of the strip toward the shoulder.

7. Apparatus for laterally supporting a thin, flexible strip of material as the strip is longitudinally directed past a reference panel comprising: a support member having a longitudinal axis extending from the reference panel, the support member including a shoulder against which a first edge of the strip is laterally positioned, a first portion adjacent to the shoulder for contacting a surface of the strip to laterally support the strip, the first portion having a width which is less than the width of the strip, and a second portion recessed from the first portion and coupled to the reference panel to define a recess between the first portion and the reference panel; means coupled to the panel defining first and second pivot points equidistant from the panel and lying in a common horizontal plane above and evenly spaced on either side of the longitudinal axis of the support member; an arm having a mass which is large relative to that of the strip coupled to the first and second pivot points to extend downward into the recess to contact and exert a lateral force on a second edge of the strip toward the shoulder.

8. Apparatus for laterally supporting a thin, flexible strip of material as it longitudinally passes a reference panel, comprising: a support member coupled to the reference panel and having a longitudinal axis extending substantially normal to the panel, the support member including a shoulder against which a first edge of the strip is laterally positioned, a first portion adjacent to the shoulder for contacting a surface of the strip to laterally support the strip, the first portion having a width which is less than the width of the strip, and a second portion recessed from the first portion and coupled to the panel to define a recess between the first portion and the panel; means coupled to the panel defining first and second pivot points equidistant from the panel and lying in a common horizontal plane above the first portion of the support member and evenly spaced on either side of the longitudinal axis of the support member; an arm having an L-shaped cross section and a mass which is substantially greater than that of the strip; and means for coupling a first straight portion of the L-shaped arm to the first and second pivot points such that a second straight portion of the L-shaped arm extends into the recess and on either side of the support member to contact a second edge of the strip as it passes over the first portion of the support member.

9. The apparatus defined in claim 8 wherein an end of the second straight portion of the L-shaped arm extending on either side of the support member is tapered at an acute angle relative to the horizontal plane of the first and second pivot points.

10. Apparatus for guiding a thin, laterally flexible strip of material as it is longitudinally directed past a stationary reference panel, comprising: a support member coupled to the reference panel and including a shoulder against which a first edge of the strip is laterally positioned, a second portion adjacent to the shoulder for contacting a surface of the strip to laterally support the strip, the first portion having a width less than the width of the strip, and the second portion recessed from the first portion to define a recess between the first portion and the panel; an arm having two end portions; means for pivoting the arm about a pivot point between the two end portions above the support member such that a first end portion extends into the recess; and means for developing a moment of force around the pivot point to cause the arm to exert a lateral force on a second edge of the strip which gently maintains the first edge of the strip in contact with the shoulder as the strip moves longitudinally over the support member.

11. The apparatus defined in claim 10 wherein the means for developing a moment of force is controllable and includes a weight, means for coupling the weight to a second end portion of the arm, and means for moving the weight relative to the arm to vary the distance between the weight and the second end portion.

References Cited in the file of this patent

UNITED STATES PATENTS

| | | |
|---|---|---|
| 2,096,113 | Kiel | Oct. 19, 1937 |
| 2,142,606 | Debrie | Jan. 3, 1939 |
| 2,493,056 | Bartelson | Jan. 3, 1950 |
| 2,726,859 | Delamore | Dec. 13, 1955 |
| 3,063,610 | Briskin et al. | Nov. 13, 1962 |